United States Patent
Hu et al.

(10) Patent No.: US 11,349,881 B2
(45) Date of Patent: May 31, 2022

(54) SECURITY-ON-DEMAND ARCHITECTURE

(71) Applicant: Alcatel Lucent, Nozay (FR)

(72) Inventors: Zhiyuan Hu, Shanghai (CN);
Xueqiang Yan, Shanghai (CN);
Zhigang Luo, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 501 days.

(21) Appl. No.: 16/320,245

(22) PCT Filed: Aug. 5, 2016

(86) PCT No.: PCT/CN2016/093489
§ 371 (c)(1),
(2) Date: Jan. 24, 2019

(87) PCT Pub. No.: WO2018/023692
PCT Pub. Date: Feb. 8, 2018

(65) Prior Publication Data
US 2019/0268384 A1    Aug. 29, 2019

(51) Int. Cl.
*H04L 29/06*    (2006.01)
*H04L 12/851*    (2013.01)
(Continued)

(52) U.S. Cl.
CPC ............. *H04L 63/205* (2013.01); *H04L 45/64* (2013.01); *H04L 47/20* (2013.01); *H04L 47/24* (2013.01);
(Continued)

(58) Field of Classification Search
CPC ....... H04L 63/205; H04L 67/10; H04L 63/08; H04L 47/24; H04L 45/64; H04L 63/20;
(Continued)

(56) References Cited

U.S. PATENT DOCUMENTS

2012/0263183 A1*  10/2012  Weill ................. H04L 45/38
                                                    370/395.53
2014/0331280 A1    11/2014  Porras et al.
(Continued)

FOREIGN PATENT DOCUMENTS

CN    101110762 A    1/2008
CN    101969661 A    2/2011
(Continued)

OTHER PUBLICATIONS

International Search Report PCT/ISA/210 for International Application No. PCT/CN2016/093489 dated Apr. 26, 2017.
(Continued)

*Primary Examiner* — Nicholas R Taylor
*Assistant Examiner* — Sanjoy Roy
(74) *Attorney, Agent, or Firm* — Harness, Dickey & Pierce, P.L.C.

(57) ABSTRACT

A first security service function chain is generated that identifies at least a first service function path comprising an identified set of security service functions, with at least one of the identified set of security service functions comprising a virtualized network function in a software defined networking (SDN) network architecture. The first security service function chain is utilized to create classification policies associating packets of a given packet type with the first security service function chain, and the first service function path is utilized to create forwarding policies specifying handling of packets of the given packet type by respective ones of the identified set of security service functions. The classification policies are provided to one or more nodes in a communication network comprising the SDN network architecture, and the forwarding policies are provided to one or more of the identified set of security service functions in the communication network.

20 Claims, 6 Drawing Sheets

(51) Int. Cl.
  *H04L 12/813* (2013.01)
  *H04L 9/40* (2022.01)
  *H04L 47/20* (2022.01)
  *H04L 47/2483* (2022.01)
  *H04L 69/22* (2022.01)
  *H04L 67/10* (2022.01)
  *H04L 47/24* (2022.01)
  *H04L 45/64* (2022.01)

(52) U.S. Cl.
  CPC .......... *H04L 47/2483* (2013.01); *H04L 63/08* (2013.01); *H04L 63/20* (2013.01); *H04L 67/10* (2013.01); *H04L 69/22* (2013.01); *H04L 63/0281* (2013.01)

(58) Field of Classification Search
  CPC ..... H04L 47/20; H04L 47/2483; H04L 69/22; H04L 63/0281
  See application file for complete search history.

(56) References Cited

U.S. PATENT DOCUMENTS

| | | | |
|---|---|---|---|
| 2015/0319089 A1 | 11/2015 | Liu et al. | |
| 2016/0182684 A1* | 6/2016 | Connor | G06F 9/45558 709/203 |
| 2016/0234224 A1* | 8/2016 | Ashley | H04L 63/20 |
| 2016/0315811 A1* | 10/2016 | Yadav | H04L 43/045 |
| 2016/0315921 A1* | 10/2016 | Dara | H04L 69/166 |
| 2016/0373474 A1* | 12/2016 | Sood | G06F 21/50 |
| 2017/0324781 A1* | 11/2017 | Hu | H04L 63/0245 |
| 2017/0346704 A1* | 11/2017 | Strijkers | G06F 9/45558 |
| 2018/0316730 A1* | 11/2018 | Schaefer | H04L 41/0803 |

FOREIGN PATENT DOCUMENTS

| | | |
|---|---|---|
| CN | 102932382 A | 2/2013 |
| CN | 105099960 A | 11/2015 |
| CN | 105141617 A | 12/2015 |
| CN | 105406992 A | 3/2016 |
| EP | 2731312 A1 | 5/2014 |
| WO | WO-2014055912 A1 | 4/2014 |
| WO | WO-2016026129 A1 | 2/2016 |

OTHER PUBLICATIONS

"Service Function Chaining (SFC) Control Plane Components & Requirements" (draft-ietf-sfc-control-plane-06) available at https://tools.ietf.org/html/draft-ietf-sfc-control-plane-06 (last accessed Jan. 24, 2019).

CA Office Action dated Dec. 2, 2020 in Chinese Application No. 201680088289.4.

Search Report for European Application No. 16911288.5 dated Jan. 8, 2020.

Shin Seungwon et al., "A First Step Toward Network Security Virtualization: From Concept To Prototype," IEEE Transactions on Information Forensics and Security, IEEE, Piscataway, NJ, vol. 10, No. 10, Oct. 1, 2015, pp. 2236-2249, XP011667231.

Office Action dated Apr. 30, 2021, issued in corresponding European Patent Application No. 16 911 288.5.

* cited by examiner

FIG. 1

| Security Function ID | Name | Type | Image Locator | Related to particular service | | Supporting/ non-supporting SFC | Instance ID | Instance Locator | Active or non-active |
|---|---|---|---|---|---|---|---|---|---|
| | | | | Previous | Next | | | | |
| xxx023 | SoD_Classifier_1 | Classifier | IP Address | - | - | Supporting | Classifier Instance 3 | IP Address | Active |
| xxx088 | AuthR_3 | Authorization | IP Address | Authentication | - | Supporting | Authorization Instance 4 | IP Address | Active |
| xxx099 | FW_6 | Firewall | IP Address | - | - | Supporting | FW Instance 3 | IP Address | Non-active |
| xxx101 | DPI_8 | Deep Packet Inspection | IP Address | - | - | Non-supporting | DPI Instance 7 | IP Address | Active |

SECURITY-ON-DEMAND ARCHITECTURE

CROSS-REFERENCE TO RELATED APPLICATIONS

This application is a national phase under 35 U.S.C. § 371 of PCT International Application No. PCT/CN2016/093489 which has an International filing date of Aug. 5, 2016, the entire contents of each of which are hereby incorporated by reference.

FIELD

The application relates generally to communication networks, and more particularly, but not exclusively, to security services in communication networks.

BACKGROUND

This section introduces aspects that may be helpful to facilitating a better understanding of the inventions. Accordingly, the statements of this section are to be read in this light and are not to be understood as admissions about what is in the prior art or what is not in the prior art.

In a traditional communication network, introducing a new network service may involve physically altering the topology of the communication network. With the advent of newer types of communication networks, including but not limited to cloud computing networks, software defined networking (SDN) and virtualized network functions (VNFs), more options are available for introducing new network services. SDN, for example, is a network architecture framework that decouples network control from the underlying network switching infrastructure so as to enable network control to become directly programmable. This decoupling allows the underlying network infrastructure to be abstracted for applications and services running on the network.

Internet Engineering Task Force (IETF) Request for Comments (RFC) 7665, which is incorporated by reference herein in its entirety, defines a service function chaining (SFC) architecture, used for the creation and ongoing maintenance of service function chains enabling service providers to deliver end-to-end services dynamically without having to change the underlying physical network topology.

However, there are challenging security issues in SDN and other types of communication networks, as well as in SFC that are not adequately addressed by existing security mechanisms.

SUMMARY

Illustrative embodiments provide techniques for providing security services on demand in communication networks. While such embodiments may be expected to provide, for example, improvements in performance and/or reduction of cost of relative to conventional approaches, no particular result is a requirement of any embodiment unless explicitly recited in a particular claim.

For example, in one embodiment, a method includes the following steps. A first security service function chain is generated, where the first security service function chain identifies at least a first service function path comprising an identified set of security service functions, at least one of the identified set of security service functions comprising a virtualized network function in a software defined networking (SDN) network architecture. The first security service function chain is utilized to create one or more classification policies associating packets of a given packet type with the first security service function chain, and the first service function path is utilized to create one or more forwarding policies specifying handling of packets of the given packet type by respective ones of the identified set of security service functions. The one or more classification policies are provided to one or more nodes in a communication network comprising the SDN network architecture, and the one or more forwarding policies are provided to one or more of the identified set of security service functions in the communication network.

In another embodiment, an article of manufacture is provided which comprises a processor-readable storage medium having encoded therein executable code of one or more software programs. The one or more software programs when executed by at least one processing device implement steps of the above-described method.

In yet another embodiment, an apparatus comprises a memory and a processor configured to perform steps of the above-described method.

Advantageously, illustrative embodiments provide techniques for addressing security concerns by providing security-on-demand enabling flexible security services to meet different security criteria from different services and applications without changing the underlying network topology.

These and other features and advantages of embodiments described herein will become more apparent from the accompanying drawings and the following detailed description.

DETAILED DESCRIPTION

Illustrative embodiments will be described herein with reference to exemplary computing systems, data storage systems, communication networks, processing platforms, systems, user devices, network nodes, network elements, clients, servers, and associated communication protocols. However, it should be understood that embodiments are not limited to use with the particular arrangements described, but are instead more generally applicable to any environment in which it is desirable to provide mechanisms and methodologies for improved security in a communication network.

As mentioned above, there are challenging security issues in many modern communication networks, such as SDN, cloud computing and other communication networks including these and other communication networks that utilize VNFs. SFC is one area in which security issues are not adequately addressed by existing security mechanisms. For example, techniques are needed to support service providers to provide flexible security services on demand. Illustrative embodiments, as will be explained in detail herein, enable a security-on-demand (SoD) architecture enabling flexible security services to meet different security criteria from different services and applications without necessarily changing an underlying network topology of a communication network. The SoD architecture, among other features described herein, enables continuous monitoring with real-time analytics to detect in-progress attacks and to provide immediate responses to prevent or mitigate such attacks. Moreover, the flexible SoD architecture can be used in designing modern network and security architecture, such as that used in 5th generation mobile networks (5G) to provide security protection in different 5G scenarios including but not limited to enhanced Mobile BroadBand (eMBB), massive Internet of Things (IoT), critical IoT, etc. These and other features of illustrative embodiments will be explained in detail below using one or more example use cases scenarios and SoD architectures. It is to be understood, however, that one of ordinary skill in the art will realize that alternative embodiments may be implemented for other use cases or SoD architectures in a straightforward manner given the inventive teachings provided herein.

Figure 1:
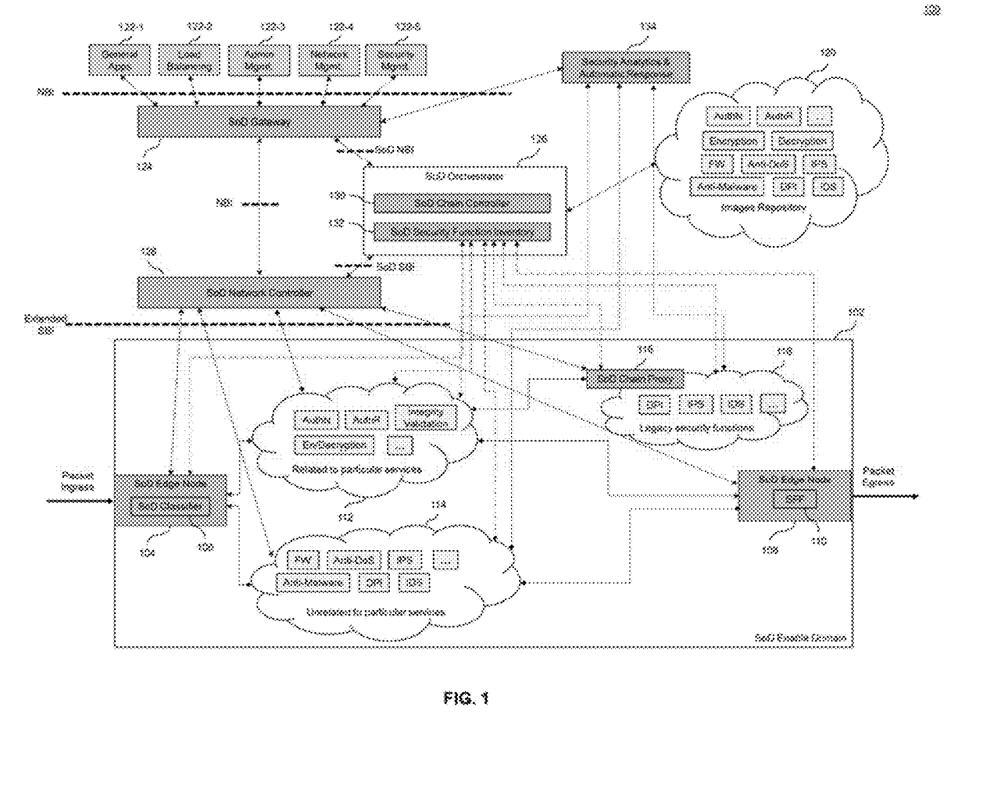
FIG. 1 shows a security-on-demand architecture according to one embodiment.

Referring now to FIG. 1, a SoD architecture 100 according to an illustrative embodiment is shown. For clarity, FIG. 1 only shows security components of a SoD architecture. The SoD architecture 100 includes a SoD Enable Domain 102, which is assumed to be secure and trusted.

The SoD Enable Domain 102 includes SoD Edge Node 104 including SoD Classifier 106, and SoD Edge Node 108 including Service Function Forwarder (SFF) 110. In some embodiments, however, each of the SoD Edge Nodes 104 and 108 includes both a SoD Classifier and a SFF. SoD Edge Node 104 including SoD Classifier 106 maintains SoD Classification policy tables, SoD Service Function Path (SFP) forwarding policy tables, or both. The SoD Classifier 106 of SoD Edge Node 104 is configured to bind an incoming flow or one or more packets to a given security service function chain and SFP as the flow or packets enter the SoD Enable Domain 102. The SFF 110 of SoD Edge Node 108 is configured to remove SFC related information and terminate the SFP of a flow or one or more packets as they exit the SoD Enable Domain 102.

The SoD Enable Domain 102 further includes a number of security functions, organized as shown in FIG. 1 into security functions that are related to particular services 112, security functions that are unrelated to particular services 114 and legacy security functions 116. Security functions may be broadly classified into two types those that are related to particular services and those that are unrelated to particular services. The security functions 112 include various security functions that are related to particular services, including security functions such as Authentication (AuthN), Authorization (AuthR), Integrity Validation, Encryption and Decryption, etc. The security functions 112 are related to a particular service and may be assigned in an ordered sequence of service functions for a particular service by cooperating with a general SFC controller not shown in FIG. 1. For example, AuthN and AuthR security functions may be inserted at a beginning of a general service function chain as these security functions may be performed before a user or client starts to access the service.

The security functions 114 include various security functions that are not related to a particular service, such as Firewall (FW), Anti-Denial of Service (DoS), Intrusion Prevention System (IPS), Anti-Malware, Deep Packet Inspection (DPI), Intrusion Detection System (IDS), etc. Generally, the security functions 114 may be added into a security service function chain at any position as they are unrelated to any particular service. In some cases, however, it may be desired to provide two or more of the security functions 114 as an ordered sequence relative to one another. As an example, in some cases it may be desired to have packets pass through a FW before processing in DPI, or vice versa such as when the FW detects some packets that are infected by a worm or virus and the FW forwards such infected packets to DPI for packet cleaning before delivery to a target address.

The security functions 112 and 114 are assumed to have SFF capability as defined in IETF RFC 7665, suitably modified with security extensions to provide the functionality described herein. Such security extensions include, by way of example, extended security SFP forwarding policy tables that support security service function chains described in further detail below.

Legacy security functions 116 include one or more security functions which may or may not be related to a particular service. The legacy security functions 116 are distinguished from security functions 112 and 114 in that they do not have SFF capability as defined in IETF RFC 7665. For the legacy security functions 116, which in the FIG. 1 example include functions such as DPI, IPS, IDS, etc., the SoD Chain Proxy 118 is put before such functions in order to remove or insert security SFC encapsulation on behalf of the legacy security functions 116. The SoD Chain Proxy 118 may have the capabilities of the SFC Proxy defined in IETF RFC 7665, suitably modified with security extensions to provide the functionality described herein. Such extensions include, by way of example, extended support for security service function chains by maintaining extended security SFP forwarding policy tables described in further detail below.

The security functions 112, 114 and 116 may be VNFs or Physical Network Functions (PNFs). Images repository 120, which may be a cloud-based repository, stores images of virtualized security functions. When necessary, selected images from the images repository 120 may be encrypted and transported to a remote site or host and instantiated to provide security service functions in the SoD Enable Domain 102. As used herein and in the claims, instantiation is defined as "creating an instance". A selected image of a security service function is thus instantiated when an instance of that security service function is created. In some embodiments, this involves installing or otherwise running the security service function on a host in the SDN network architecture of the SoD Enable Domain 102.

It is to be appreciated that FIG. 1 does not show an exhaustive list of possible security functions, but rather presents examples of security functions for purposes of illustration only. Thus, embodiments are not limited solely to use with the specific set of security functions shown in the images repository 120 or in the security functions 112, 114 and 116. Instead, various other types of security functions may be utilized, including but not limited to virus scanning security functions, packet cleaning security functions, spyware and/or malware scanning functions, deep flow scanning functions, deep content inspection functions, packet filtering security functions content filtering functions, category-based filtering functions, web filtering functions, etc.

The SoD architecture 100 includes various application and management services, such as general applications 122-1, load balancing 122-2, administration management 122-3, network management 122-4 and security management 122-5, collectively referred to herein as logical functions 122. The logical functions 122 can send network policies and requirements, including security related policies and requirements, to the underlying communication network via the North Bound Interface (NBI) to SoD Gateway 124. The security related policies and requirements are examples of security criteria. Security criteria may also include one or more security preferences, rules, etc.

The SoD Gateway 124 is configured as a logical gateway that receives network policies and requirements from various applications and management services such as logical functions 122 via the NBI. In some embodiments, the NBI is a standard SDN NBI providing application programming interfaces (APIs) for permitting communication between the SDN environment and services and applications utilizing a communication network including the SDN environment. The SoD Gateway 124 decomposes network policies and requirements and extracts security related policies and requirements. The security related policies and requirements are forwarded, combined with information related to the service and user, from the SoD Gateway 124 to the SoD Orchestrator 126. The information related to the service and user may include a service ID, service type, user ID, etc. Network policies and requirements that are not related to security may be transported to a next hop, such as the SoD Network Controller 128, transparently over the NBI. In some embodiments, the SoD Gateway 124 is integrated into the SFC control plane defined in IETF RFC 7665. For clarity of illustration, the SFC control plane is not shown in FIG. 1.

The SoD Orchestrator 126 is configured to define security service function chains according to security related policies and requirements of applications and services that are received from logical functions 122 via the SoD Gateway 124. The SoD Orchestrator 126 includes SoD Chain Controller 130 and SoD Security Function Inventory 132.

SoD Chain Controller 130 is configured, based on a proposed SoD template of a security service function chain, to select appropriate security functions from the SoD Security Function Inventory 132 and to create a security service function chain. The SoD Chain Controller 130 utilizes the security service function chain to generate SoD classification policies and SoD forwarding policies. The SoD classification policies and SoD forwarding policies enforce security policies and fulfill security requirements from applications and management services of logical functions 122 that are received at the SoD Chain Controller 130 via the SoD NBI connecting the SoD Gateway 124 and the SoD Orchestrator 126.

The SoD Chain Controller 130 distributes the SoD classification policies to SoD Classifier 106 via SoD Network Controller 128. The SoD classification policies may be generated in the form of entries to be inserted into SoD classification policy tables at SoD Classifier 106. The SoD Chain Controller 130 also distributes the SoD forwarding policies to security functions in the SoD Enable Domain 102 via SoD Network Controller 128. Different SoD forwarding policies may be distributed to particular instances of the security functions 112 and 114 in SoD Enable Domain 102 so as to permit such security functions to appropriately forward flows or packets from the packet ingress at SoD Edge Node 104 to packet egress at SoD Edge Node 108. SoD forwarding policies may also be distributed to SoD Chain Proxy 118 via SoD Network Controller 128 to permit proper forwarding of flows and packets for legacy security functions 116. Similar to the SoD classification policies, the SoD forwarding policies may be generated in the form of entries to be inserted into SoD forward policy tables at one or more of the SoD Classifier 106, SFF 110, security functions 112 and 114 and SoD Chain Proxy 118.

Security service function chains may by one of several different types. A first type of security service function chain is unrelated to any particular service. For the first type of security service function chains, the SoD Chain Controller 130 can create a security service function chain by adding security functions such as a Firewall into a service chain and then distributing the relevant SoD classification policies and SoD forwarding policies to the SoD Classifier 106, SFF 110 and security functions 112 and 114 in the SoD Enable Domain 102 with SFF capability, and to the SoD Chain Proxy 118 for legacy security functions 116 in the SoD Enable Domain 102 without SFF capability.

A second type of security service function chain is related to a particular service. For the second type of security service function chains, the SoD Chain Controller 130 cooperates with a service chain controller (not shown in FIG. 1 for clarity of illustration) to make an ordered sequence for all selected service functions, e.g., for security functions and non-security functions. Thus, the security service function chain created by the SoD Chain Controller 130 may be added or inserted, in an ordered sequence, into the existing or general service function chain for a particular service.

SoD templates for security service function chains may be created for use by the SoD Chain Controller 130 in selecting the security functions needed to meet one or more security requirements for a given application or service, e.g., the requirements provided by logical functions 122 to the SoD Orchestrator 126 via SoD Gateway 124. The SoD templates may further indicate an ordered sequence for the selected security functions. For example consider an end user that wants to access Server_X through Application_Y. Application_Y, which may be considered an example of a general application 122-1, submits the request on behalf of the end user to the SoD Orchestrator 126 via SoD Gateway 124. The SoD template of the security service function chain may include the ordered sequence of Authentication→Authorization→Firewall. For those security functions that are unrelated to particular services, the SoD template may indicate the security functions to be selected without necessarily indicating an ordered sequence of such security functions.

The SoD Chain Controller 130 may utilize mechanisms such as access control lists (ACLs) and role based access control (RBAC) in order to avoid policy conflicts when inserting or updating SoD classification policies and SoD forwarding policies in corresponding policy tables.

For security service function chains that are related to particular services, the associated SoD classification policies and SoD forwarding policies may be made user-aware and service-aware.

The SoD classifier 106, is configured to forward traffic that satisfies SoD classification rules or policies according to one or more specific SFPs. SoD classification can occur at varying degrees of granularity. For example, classification can use a 5-tuple, a transport port or set of ports, part of the packet payload, etc. Classification may also be the result of high-level inspection, or may be based on information obtained from external systems. SoD classifier 106, as mentioned above, may include a SoD classification policy table with entries that are inserted or updated by the SoD Chain Controller 130 via SoD Network Controller 128. In some embodiments, the SoD classification policy table is an extension of the classification policy table defined in the IETF Internet-Draft "Service Function Chaining (SFC) Control Plane Components & Requirements" (draft-ietf-sfc-control-plane-06) available at https://tools.ietforg/html/draft-ietf-sfc-control-plane-06 and incorporated by reference herein in its entirety. The classification policy table is extended to reflect security related policies for binding an incoming flow or packet to a given security service function chain and SFP.

For example, when receiving a network access authentication request from a user equipment (UE) to attach to a 3GPP wireless network, the SoD Classifier 106 will extract certain information, such as a temporary mobile subscriber identity (TMSI) or global unique temporary ID (GUTI) and UE capabilities from the request message, then look up the SoD classification policy table to find a matched policy and decide on the authentication mechanisms (e.g., Global System for Mobile communication (GSM) Authentication and Key Agreement (AKA), Universal Mobile Telecommunications System (UMTS) AKA, Evolved Packet System (EPS) AKA, etc.) to select for the received network access authentication request.

SoD classification policies may include various attributes or profiles. In some embodiments, a SoD classification policy or rule has attributes including a 5-tuple, a transport port or set of ports, part of the packet payload, a user identifier, a service identifier, a service type, a classification type, a SFP identifier, a sequence of the selected security functions, an owner of the classification policy (e.g., who generated the classification policy), the role of the classification policy generator, a next hop locator, one or more actions (e.g., forwarding, dropping, etc.), etc. The owner of the classification policy and the role of the classification policy generator may be used to avoid conflicting policies. It is to be appreciated, however, that embodiments may use various other attributes in addition to or in place of one or more of these attributes, and that in some cases more or fewer attributes may be used for a SoD classification policy.

The SoD Classifier 106, SFF 110, service functions 112 and 114 and SoD Chain Proxy 118 may include SoD SFP forwarding policy tables. The SoD SFP forwarding policy tables may be an extension of the SFP forwarding policy table described in the IETF Internet-Draft "Service Function Chaining (SFC) Control Plane Components & Requirements" (draft-ietf-sfc-control-plane-06). The SFP forwarding policy table may be extended to support security service function chains.

SoD forwarding policies may include various attributes or profiles. In some embodiments, a SoD forwarding policy has attributes including a 5-tuple, a transport port or set of ports, part of the packet payload, a user identifier, a service identifier, a service type, a SFP identifier, an owner of the forwarding policy (e.g., who generated the forwarding policy), the role of forwarding policy generator, a next hop locator, one or more actions (e.g., forwarding, dropping, etc.), etc. It is to be appreciated, however, that embodiments may use various other attributes in addition to or in place of one or more of these attributes, and that in some cases more or fewer attributes may be used for a SoD forwarding policy.

Figure 2:
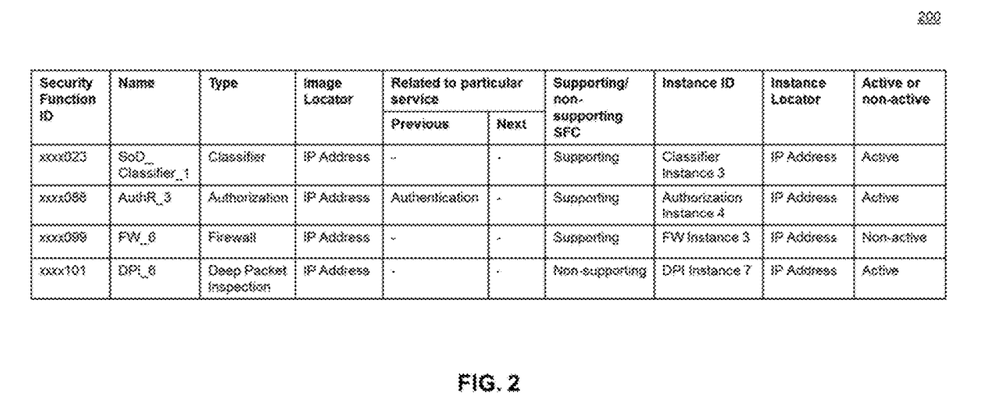
FIG. 2 shows an example of a security function inventory according to one embodiment.

SoD Security Function Inventory 132 may, in some embodiments, take the form of a list or table showing the status of one or more security functions in the images repository 120. FIG. 2 shows a table 200 of an example of such a security function inventory. As shown, the table includes profiles or attributes including: a security function identifier (ID); a security function name; a security function type; a location of the security function in the images repository 120; an indication of whether the security function is or is not related to a particular service and, if the security function is related to a particular service which security functions to place before or after that security function; whether the security function supports SFC or whether the security function has SFF capabilities; an instance ID, an instance locator, and an indication of whether the service function is active in the SoD Enable Domain 102.

In the particular example table 200, there are four security functions listed. The security functions SoD_Classifier_1, AuthR_3 and DPI_6 are active instances in the SoD Enable Domain 102 which may be located by an Internet Protocol (IP) address. The security function DPI_6 is a legacy security function, while the other security functions are supporting SFC or have SFF capability. The security function AuthR_3 is related to a particular service, and must be placed after an Authentication service function. Each of the service functions may be located in images repository 120 via IP addresses, and are of varying types as shown. Although the table 200 shows an example wherein the image locators and instance locators are IP addresses, embodiments are not limited solely to use with IP address locators. Various other types of locators may be used, including but not limited to media access control (MAC) addresses. In addition, the SoD Security Function Inventory 132 may contain more or fewer than four entries, and may include multiple entries for different instances of a same security service function type.

The SoD Security Function Inventory 132 may, in some embodiments, periodically check the status of the SoD Classifier 106, SFF 110, service functions 112 and 114 and SoD Chain Proxy 118 to make updates in the inventory accordingly, such as updating the active/inactive status of particular security function instances. In some embodiments, one or more of the SoD Classifier 106, SFF 110, service functions 112 and 114 and SoD Chain Proxy 118 may actively report status updates to the SoD Security Function Inventory 132 when their status changes (e.g., from active to inactive or vice versa, when an IP address or port changes, etc.).

After selecting an appropriate SoD template for a security service function chain, the SoD Chain Controller 130 can look up the related security functions from the SoD Security Function Inventory 132 to check the active status of such security functions, and then defines the SFP. If any needed security functions are inactive or otherwise unavailable in SoD Enable Domain 102, they may be obtained from images repository 120 for instantiation in the SoD Enable Domain 102 using the image locator information. The SoD Chain Controller 130 next generates the SoD classification policy entries and SoD SFP forwarding policy entries for insertion or update into SoD classification policy tables and/or SoD forwarding policy tables at the SoD Classifier 106, SFF 110, service functions 112 and 114 and SoD Chain Proxy 118.

SoD Network Controller 128 receives messages from the SoD Orchestrator 126 over the SoD southbound interface (SBI). These messages may include the SoD classification policies and SoD SFP forwarding policies, which the SoD Network Controller 128 provides to the SoD Classifier 106, SFF 110, service functions 112 and 114 and SoD Chain Proxy 118 so as to update SoD classification policy tables and SoD forwarding policy tables as needed. The SoD Network Controller 128 extends a general SDN controller to support security service function chains, such as in distributing SoD classification policies and SoD forwarding policies. The SoD Network Controller 128 may also maintain SoD classification policy tables, SoD forwarding policy tables and SDN flow tables.

Security Analytics & Automatic Response (SAAR) 134 is configured to periodically fetch security events from security functions 112, 114 and 116. The SoD Classifier 106 and various ones of the security functions 112, 114 and 116 may report security events to SAAR 134 if they encounter security attacks or observe potential security issues. SAAR 134 analyzes security events and reports from SoD Classifier 106 and security functions 112, 114 and 116 to find appropriate security countermeasures and sends security protection requests to the SoD Gateway 124 via the NBI. The SoD Gateway 124 receives the security protection request from SAAR 134 and forwards them to the SoD Orchestrator 126. The SoD Orchestrator 126, via SoD Chain Controller 130, creates corresponding security service function chains and generates and distributes associated SoD classification policies and SoD forwarding policies as described above. Thus, in some embodiments security attacks can be detected and prevented or mitigated automatically using SAAR 134 in conjunction with other components of the SoD architecture 100 as described.

As shown in FIG. 1, the SoD architecture 100 includes a number of interfaces. The SoD NBI is an interface between the SoD Gateway 124 and SoD Orchestrator 126. Security related network policies and requirements are sent via the SoD NBI between the SoD Gateway 124 and SoD Orchestrator 126. The SoD SBI is an interface between the SoD Orchestrator 126 and the SoD Network Controller 128. SoD classification policies and SoD forwarding policies are sent from the SoD Orchestrator 126 to the SoD Network Controller 128 via the SoD SBI. The extended SBI extends the general SDN southbound interface to support distributing SoD classification policies and SoD forwarding policies from the SoD Network Controller 128 to various elements in the SoD Enable Domain 102 such as SoD Classifier 106, SFF 110, security functions 112 and 114 and SoD Chain Proxy 118.

Various information may be provided to the SoD system at bootstrapping. For example, the SoD Gateway 124 may be provisioned with a set of rules on how to decompose general network policies and requirements to extract security related policies and requirements. The SoD Chain controller 130 may be provisioned with a set of SoD templates for security service function chains. The predefined SoD templates may be associated with particular types of security services. As an example, consider an end user that wants to access Server_X through Application_Y. The Application_Y may submit such a request on behalf of the user to the SoD system. The SoD Chain Controller 130 may determine that the SoD template matched to this request includes the ordered sequence Authentication→Authorization→Firewall. The SoD Security Function Inventory 132 may be provisioned with a status list of the security functions in SoD Enable Domain 102.

The SoD architecture 100 may be used in a variety of different use cases. Examples of such use cases will now be described in detail with respect to FIGS. 3 and 4.

Figure 3:
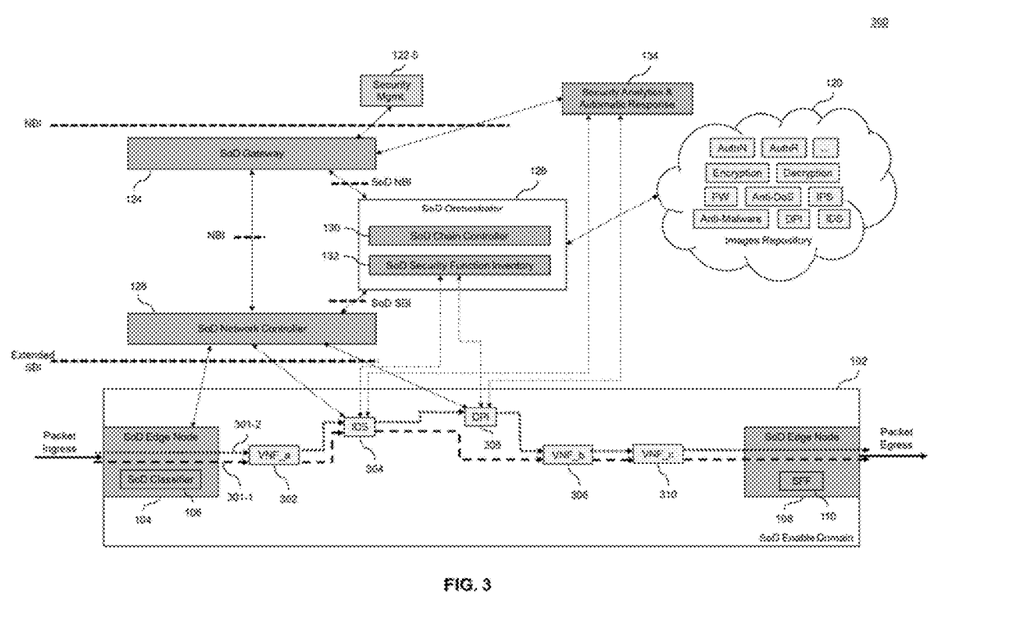
FIG. 3 shows an example of inserting a security function into a security function chain in the FIG. 1 security-on-demand architecture according to one embodiment.

FIG. 3 shows an example flow 300 in the SoD architecture 100 for inserting a security function into an existing security service function chain. The flow 300 illustrates a number of features of the SoD architecture 100, including illustrating a security service function chain that is not related to a particular service and illustrating how the SAAR 134 may be used to automatically respond to security attacks. FIG. 3 shows a security service function chain path 301-1, also referred to as SFP 301-1. The SFP 301-1 includes SoD Edge Node 104 VNF_a 302→IDS 304→VNF_b 308→VNF_c 310→SoD Edge Node 108. Packets entering the SoD Edge Node 104 may be classified using SoD Classifier 106 and bound to SFP 301-1.

VNF_a 302, VNF_b 308, and VNF_c 310 may represent various different VNFs. As one example, in a backbone network VNF_a 302 and/or VNF_c 310 may be border routers while VNF_b 308 may be an optical cross-connect in a fiber optical network. As another example, in a Long-Term Evolution (LTE) network, VNF_a 302 may be an evolved node B (eNB) while VNF_b 308 is a serving gateway (GW) and VNF_c 310 is a Packet Data Network (PDN) GW. VNF_a 302, VNF_b 308 and VNF_c 310 may represent various other types of VNFs in other embodiments. In addition, while FIG. 3 illustrates an example service function path chain that includes three VNFs, this is not a requirement. Other service function path chain may utilize more or fewer than three VNFs.

Over time, the different security functions in the SFP 301-1 may report to SAAR 134. For example, IDS 304 may report security events to the SAAR 134. If, after some time, the IDS 304 detects that some packets in the SFP 301-1 include viruses or are part of DoS attacks, the IDS 304 may report this to the SAAR 134. After analyzing the reports and possible other information relating to traffic flows in the SoD Enable Domain 102, the SAAR 134 may make a decision to perform traffic cleaning and sends a traffic cleaning request to the SoD Orchestrator 126 via the SoD Gateway 124. It is important to note, however, that various other types of requests may be sent from SAAR 134 to the SoD Orchestrator 126 in response to security reports and analysis of a flow or packets in SFP 301-1. For example, the SAAR 134 may send a request to add encryption to packet flows, to analyze for specialized types of attacks such as a particular type of exploit or attack vector, etc.

The SoD Orchestrator 126 receives the traffic cleaning request from SAAR 134, and the SoD Chain Controller 130 of the SoD Orchestrator 126 determines that the security function DPI can perform traffic cleaning so as to satisfy the traffic cleaning request based on one or more SoD templates. The SoD Chain Controller 130 checks the SoD Security Function Inventory 132 to see if there is an active instance of DPI in the SoD Enable Domain 102. If there is an active DPI instance, e.g., DPI 306, the SoD Chain Controller 130 proceeds with creating a security service function chain by inserting DPI 306 into the SFP 301-1. If there is no active instance of DPI, the SoD Chain Controller 130 can find an appropriate host in the SoD Enable Domain 102 via a network topology view, and informs the images repository 120 send a DPI image to that host to create a new DPI instance. The SoD Security Function Inventory 132 is then updated accordingly with the status of the new DPI instance.

SoD Chain Controller 130 creates an updated security service function chain by creating a new security service function path 301-2, also referred to herein as SFP 301-2. The SFP 301-2 includes SoD Edge Node 104→VNF_A 302→IDS 304→DPI 306→VNF_b 308→VNF_C 310→SoD Edge Node 108. The SoD Chain Controller 130 updates SoD classification policies, and distributes such updates to the SoD Classifier 106 of SoD Edge Node 104 via SoD Network Controller 128. The SoD Chain Controller 130 further updates SoD forwarding policies, and distributes such updates to the IDS 304 and DPI 306 via SoD Network Controller 128. Distributing the updates to the SoD classification policies and SoD forwarding policies may include adding or updating classification policy entries in a SoD classification policy table and adding or updating forwarding policy entries in SoD forwarding policy tables.

New flows or packets arriving at SoD Edge Node 104 may be bound to the SFP 301-2, and virus attacks or DoS attacks may be prevented or mitigated automatically via the addition of DPI 306 to the security service function chain. In some embodiments, the SFP 301-2 replaces the SFP 301-1 altogether. In other embodiments, the SFP 301-2 may be added without removing SFP 301-1. Incoming packets or flows may be assigned to SFP 301-1 or SFP 301-2 based on classification policies. For instance, the SAAR 134 may determine, based on reporting by IDS 304 or other security functions, that only certain types of packets or flows would benefit from the use of DPI 306 in SFP 301-2. Thus, SFP 301-2 may be added as an additional option for binding incoming flows or packets at the SoD Edge Node 104, rather than necessarily replacing SFP 301-1 as an option for binding incoming flows or packets.

Figure 4:
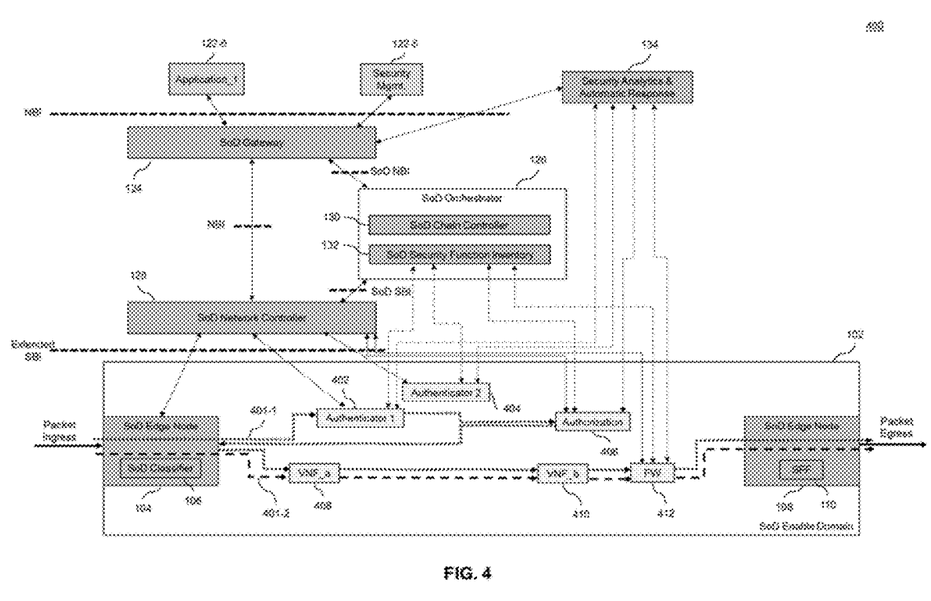
FIG. 4 shows an example of creating security function chains in the FIG. 1 security-on-demand architecture according to one embodiment.

FIG. 4 shows an example flow 400 in the SoD architecture 100 for creating a new security service function chain. The flow 400 illustrates a number of features of the SoD architecture, including illustrating security service function chains that are related to a particular service.

In the example flow 400, it is assumed that all the required security functions are instantiated, active and available or ready to provide services in the SoD Enable Domain 102. This, however, is not a requirement. As detailed above in the example flow 300, any required security functions that are not active or available in the SoD Enable Domain 102 may be obtained from the images repository 120, which is not shown in FIG. 4 for clarity of illustration.

The example flow 400 begins with a new application service deployed in a communication network. A first end user seeks to access the application service, e.g., Application_1 122-6 sends an access request to a server on behalf of the end user. The SoD Classifier 106 of SoD Edge Node 104 receives the first message sent from Application_1 122-6 on behalf of the first end user, but is unable to find or map the first message to an existing security service function chain and corresponding SFP in the SoD classification policy table. The SoD Classifier 106 thus sends a request to the SoD Chain Controller 130, via the SoD Network Controller 128, to obtain a classification policy for the first message. The SoD Chain Controller 130 utilizes one or more SoD templates to select the related security functions for the first message from SoD Security Function Inventory 132, and builds or creates a security service function chain.

The SoD Chain Controller 130, in this example, builds a combined security service function chain that includes two SFPs, SFP 401-1 and SFP 401-2. The SFP 401-1 includes SoD Edge Node 104→Authenticator_1 402→Authorization 406→SoD Edge Node 104→VNF_a 408→VNF_b 410→FW 412→SoD Edge Node 108. SFP 401-1 is selected by the SoD Classifier 106 in SoD Edge Node 104 when receiving the first message sent from Application_1 122-6 on behalf of the first end user. The SFP 401-2 includes SoD Edge Node 104→VNF_a 408→VNF_b 410→FW 412→SoD Edge Node 108. SFP 401-2 is selected by the SoD Classifier 106 when receiving the second message and other subsequent messages sent from Application_1 122-6 on behalf of the first end user after the first end user is authenticated.

VNF_a 408 and VNF_b 410, similar to VNF_a 302, VNF_b 308 and VNF_c 310, may be various different types of VNFs. As an example, the SFPs 401-1 and 401-2 may be used for packets or flows of a web service implemented in a Component Object Model (COM), distributed COM (DCOM) or Common Object Request Broker Architecture (COBRA) model. In such cases, VNF_a 408 may be a portal server while VNF_b is a middleware server responsible for business logical processes. In this case, a database may be deployed behind FW 412.

The SoD Chain Controller 130 generates SoD classification policy entries and SoD forwarding policy entries based on the SFP 401-1 and SFP 401-2. The SoD classification policy entries are distributed to SoD Classifier 106 at SoD Edge Node 104 via the SoD Network Controller 128 so as to update a SoD classification policy table. The SoD forwarding policy entries are distributed to the security functions Authenticator_1 402, Authenticator_2 404, Authorization 406 and FW 412 via the SoD Network Controller 128 to update corresponding SoD forwarding policy tables.

The SoD Chain Controller 130 then responds to the request from the SoD Classifier 106 with the SoD classification policy for the first message, and the SoD Classifier 106 selects SFP 401-1 for the first message. Once the first end user is successfully authenticated over path SFP 401-1, subsequent messages in that flow will be forward over SFP 401-2.

Thereafter, when the SoD Edge Node 104 receives messages from a second end user or other additional end users seeking to access the application service provide by Application_1 122-6, the SoD Classifier 106 can use the updated SoD classification policy table to correctly bind the flow or packets to the appropriate SFP, e.g., SFP 401-1 for the first message from each such additional user and SFP 401-2 for additional messages from each authenticated additional user.

Figure 5:
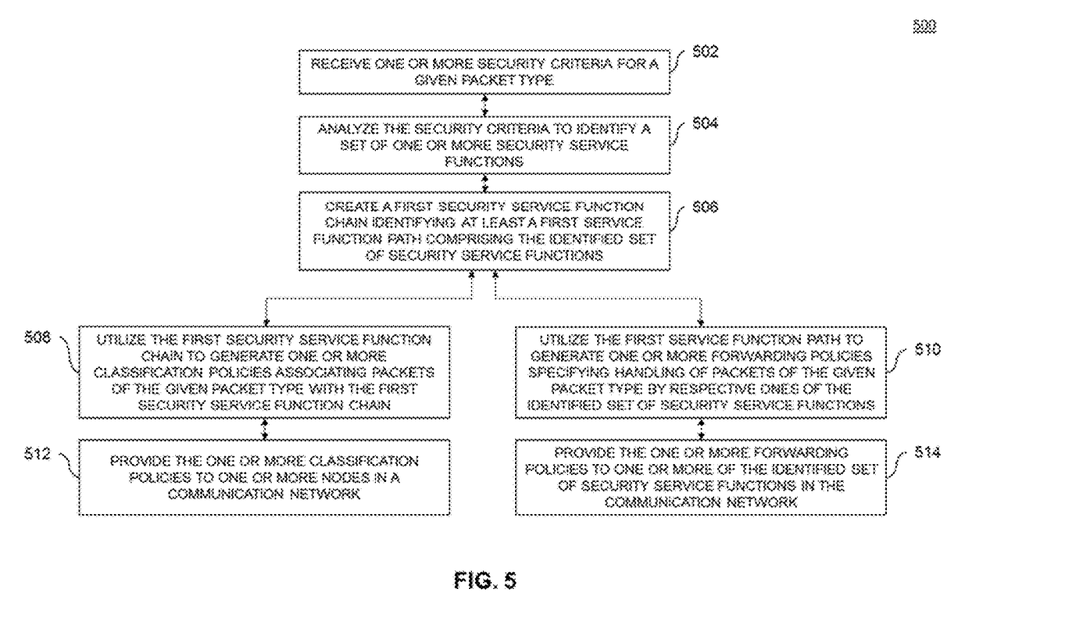
FIG. 5 shows a security methodology for use in a security-on-demand architecture according to one embodiment.

Referring now to FIG. 5, a methodology 500 will now be described. The methodology 500 may be performed by the SoD architecture 100 shown in FIG. 1. In step 502, one or more security criteria for a given packet type are received. Step 502, in some embodiments, may be performed by the SoD Chain Controller 130 receiving application or service policies, requirements, preferences or other criteria from one or more of the logical functions 122 via the SoD Gateway 124. The given packet type may identify a type of network flow, one or more messages or requests, etc.

The one or more security criteria are analyzed in step 504 to identify a set of security service functions. The SoD Chain Controller 130, in some embodiments, performs this step by comparing the received security criteria against a set of pre-defined SoD templates. Identifying the set of security service functions may include the SoD Chain Controller 130 checking the active status of the identified security service functions utilizing SoD Security Function Inventory 132. If any security functions are needed but not active or available in SoD Enable Domain 102, the SoD Chain Controller 130 may identify an available host in the network topology of a communication network and direct the images repository 120 to deliver a security function image for instantiation on that host in the communication network. The communication network may be a software defined network, and the security functions may be PNFs and/or VNFs.

In step 506, a first security service function chain is created, where the first security service function chain identifies at least a first SFP comprising the identified set of security service functions. As described above with respect to FIG. 4, in some cases a security service function chain may include two or more distinct SFPs, such as a first SFP to use for authenticating a first message in a flow and a second SFP to use for additional messages in the flow following successful authentication.

In some embodiments, the first security service function chain is related to a given service, such as a particular application, and step 506 involves adding the identified set of security service functions in an ordered sequence to an existing service function chain for the given service. The example flow 400 in FIG. 4 illustrates creation of a service function chain that is related to a given service, namely, Application_1 122-6. In other embodiments, the first security service function chain is not related to any particular service, and step 506 involves selecting the identified set of security service functions without necessarily specifying any ordered sequence for the identified set of security service functions. The example flow 300 in FIG. 3 illustrates creation of a service function chain that is not related to any particular service.

Creating the first security service function chain in step 506 may include creating a new security service function chain. This may be done in response to receiving a first packet, such as a message or request, at SoD Edge Node 104 in the SoD Enable Domain 102 that does not map to one or more existing classification policies in SoD Classifier 106. It is important to note that, in this context, a security service function chain may be considered as new even if it is inserted into an existing general service function chain for the given application. The term new in this context indicates that any existing general service function chain for the given application does not include an existing security service function chain.

Step 506 may, in some embodiments, include creating the first security service function chain by modifying an existing security service function chain. An existing security service function chain may be modified in response to security analysis of a flow of packets of the existing security service function chain. FIG. 3 illustrates an example of such a scenario, wherein the SFP 301-1 is modified in response to security analysis by SAAR 134. The security analysis may include the SAAR 134 performing real-time monitoring of the flow of packets in the communication network. The SAAR 134 may also or alternatively perform security analysis based on reporting from security service functions in the SoD Enable Domain 102, based on updated security criteria from logical functions 122, etc.

In step 508, the first security service function chain is utilized to generate one or more SoD classification policies that associate packets of the given packet type with the first security service function chain. Step 508 in some embodiments includes generating entries for a SoD classification policy table. The first service function path is utilized to generate one or more SoD forwarding policies in step 510, wherein the SoD forwarding policies specify handling of packets of the given type by respective ones of the identified set of security service functions. Step 510 in some embodiments includes generating entries for SoD forwarding policy tables. Steps 508 and 510 may be performed by the SoD Chain Controller 130 as described above.

The SoD classification polices generated in step 508 may comprise a service flow path identifier, a sequence of the identified set of security functions, a classification policy generator identifier, a role of the classification policy generator, a classification type, a service identifier, a service type, a next hop locator and one or more actions. The SoD classification policies are used to bind incoming packets to particular SFPs. As described above in the FIG. 4 example, in some cases the first security service function chain identifies two or more different SFPs such as SFP 401-1 and 401-2. The SoD classification policy may, in addition to binding incoming flows to the first security service function chain, also specify rules for assigning packets of the given packet type to the different SFPs.

The SoD forwarding policies generated in step 510 may comprise a service flow path identifier, a forwarding policy generator identifier, a role of the forwarding policy generator, a service identifier, a next hop locator and one or more actions. The SoD forwarding policies are used by security service functions to determine where to send packets of a flow in accordance with the first security service function chain. As described above, some security functions such as security functions 112 and 114 include SFF capability, and thus may be able to utilize the SoD forwarding policies to appropriately pass packets to different security functions in a SFP. The SoD Chain Proxy 118 may provide SFF capability on behalf of legacy security functions 116 without such capability.

In step 512, the one or more SoD classification policies are provided to one or more nodes in the communication network. In some embodiments, the nodes may be edge nodes in a SDN network architecture. In step 514, the one or more SoD forwarding policies are provided to one or more of the identified set security service functions in the communication network. In some embodiments, such security service functions may be implemented by or associated with nodes in the communication network such as edge nodes in a SDN network architecture. SoD Chain Controller 130 may distribute the SoD classification policies to SoD Edge Nodes 104 and 108 via SoD Network Controller 128. SoD Chain Controller 130 may distribute the SoD forwarding policies to SoD Classifier 106, SFF 110, security service functions 112 and 114 and SoD Chain Proxy 118.

Figure 6:
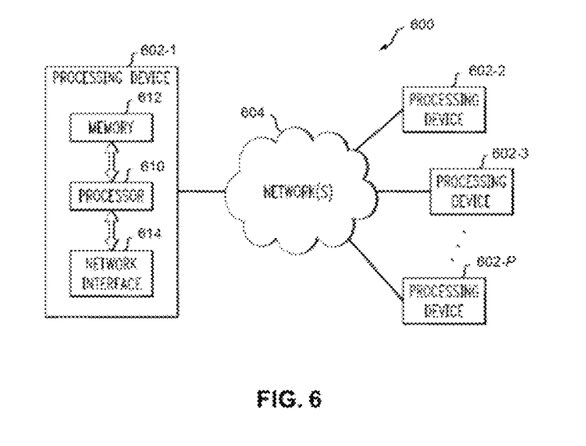
FIG. 6 shows a processing platform on which a security-on-demand architecture is implemented according to one or more embodiments.

Turning now to FIG. 6, a processing platform is shown on which a security-on-demand architecture (e.g., 100 in FIG. 1) is implemented according to one or more embodiments. The processing platform 600 in this embodiment comprises a plurality of processing devices denoted 602-1, 602-2, 602-3, . . . 602-P, which communicate with one another over a network 604. One or more of the components and/or modules of architecture 100 (e.g., APIs, components, databases, etc.) may therefore each run on one or more computers or other processing platform elements, each of which may be viewed as an example of what is more generally referred to herein as a "processing device." As illustrated in FIG. 6, such a device generally comprises at least one processor and an associated memory, and implements one or more functional modules for instantiating and/or controlling features of systems and methodologies described herein. Multiple elements or modules may be implemented by a single processing device in a given embodiment.

The processing device 602-1 in the processing platform 600 comprises a processor 610 coupled to a memory 612. The processor 610 may comprise a microprocessor, a microcontroller, an application-specific integrated circuit (ASIC), a field programmable gate array (FPGA) or other type of processing circuitry, as well as portions or combinations of such circuitry elements. Components of a system as disclosed herein can be implemented at least in part in the form of one or more software programs stored in memory and executed by a processor of a processing device such as processor 610. Memory 612 (or other storage device) having such program code embodied therein is an example of what is more generally referred to herein as a processor-readable storage medium. Articles of manufacture comprising such processor-readable storage media are considered embodiments. A given such article of manufacture may comprise, for example, a storage device such as a storage disk, a storage array or an integrated circuit containing memory. The term "article of manufacture" as used herein should be understood to exclude transitory, propagating signals.

Furthermore, memory 612 may comprise electronic memory such as random access memory (RAM), read-only memory (ROM) or other types of memory, in any combination. The one or more software programs when executed by a processing device such as the processing device 602-1 causes the device to perform functions associated with one or more of the components/steps of system/methodology 500. One skilled in the art would be readily able to implement such software given the teachings provided herein. Other examples of processor-readable storage media embodying embodiments may include, for example, optical or magnetic disks.

Also included in the processing device 602-1 is network interface circuitry 614, which is used to interface the processing device with the network 604 and other system components. Such circuitry may comprise conventional transceivers of a type well known in the art.

The other processing devices 602 of the processing platform 600 are assumed to be configured in a manner similar to that shown for processing device 602-1 in the figure.

The processing platform 600 shown in FIG. 6 may comprise additional known components such as batch processing systems, parallel processing systems, physical machines, virtual machines, virtual switches, storage volumes, logical units, etc. Again, the particular processing platform shown in FIG. 6 is presented by way of example only, and the architecture 100 of FIG. 1 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network, a converged network or various portions or combinations of these and other types of networks.

Furthermore, it is to be appreciated that the processing platform 600 of FIG. 6 can comprise virtual machines (VMs) implemented using a hypervisor. A hypervisor is an example of what is more generally referred to herein as "virtualization infrastructure." The hypervisor runs on physical infrastructure. Processing platform 600 may also include multiple hypervisors, each running on its own physical infrastructure. As is known, VMs are logical processing elements that may be instantiated on one or more physical processing elements (e.g., servers, computers, processing devices). That is, a VM generally refers to a software implementation of a machine (i.e., a computer) that executes programs like a physical machine. Thus, different VMs can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

Although certain illustrative embodiments are described herein in the context of communication networks utilizing particular communication protocols, other types of networks can be used in other embodiments. As noted above, the term "network" as used herein is therefore intended to be broadly construed. Further, it should be emphasized that the embodiments described above are for purposes of illustration only, and should not be interpreted as limiting in any way. Other embodiments may use different types of network, device and module configurations, and alternative communication protocols, process steps and operations for implementing a security-on-demand architecture. The particular manner in which network nodes communicate can be varied in other embodiments. Also, it should be understood that the particular assumptions made in the context of describing the illustrative embodiments should not be construed as requirements of the inventions. The inventions can be implemented in other embodiments in which these particular assumptions do not apply. These and numerous other alternative embodiments within the scope of the appended claims will be readily apparent to those skilled in the art.

What is claimed is:

1. A method performed by a processing device, the method comprising:
   identifying a set of security service functions associated with at least one given packet type from among at least a first set of security service functions and a second set of security service functions,
      the first set of security service functions related to a particular service, the first set of security service functions including at least one of Authentication, Authorization, Integrity Validation, and Encryption and Decryption, or any combinations thereof, and
      the second set of security service functions not related to any particular service, the second set of security service functions including at least one of Firewall, Anti-Denial of Service (DoS), Intrusion Prevention System, Anti-Malware, Deep Packet Inspection, Intrusion Detection System, or any combinations thereof;
   creating a first security service function chain identifying at least a first service function path comprising the identified set of security service functions, at least one of the identified set of security service functions comprising a virtualized network function in a software defined networking (SDN) network architecture;
   utilizing the first security service function chain to generate one or more classification policies associating packets of the given packet type with the first security service function chain;
   utilizing the first service function path to generate one or more forwarding policies specifying handling of packets of the given packet type by respective ones of the identified set of security service functions;
   providing the one or more classification policies to one or more nodes in a communication network comprising the SDN network architecture; and
   providing the one or more forwarding policies to one or more of the identified set of security service functions in the communication network.

2. The method of claim 1, further comprising:
   receiving one or more security criteria for the given packet type; and
   analyzing the one or more security criteria to determine the identified set of security service functions.

3. The method of claim 1, wherein at least one of the identified set of security service functions comprises a physical network function.

4. The method of claim 1, wherein
   the first security service function chain is related to a particular service; and
   the creating the first security service function chain comprises adding the identified set of security service functions in an ordered sequence to an existing service function chain for the particular service.

5. The method of claim 1, wherein
   the first security service function chain is not related to any particular service; and the creating the first security service function chain comprises selecting the identified set of security service functions.

6. The method of claim 1, wherein the creating the first security service function chain comprises creating a new security service function chain.

7. The method of claim 6, wherein the creating the new security service function chain is responsive to receiving a first packet at one of the nodes in the communication network that does not map to one or more existing classification policies.

8. The method of claim 1, wherein the creating the first security service function chain comprises modifying an existing security service function chain.

9. The method of claim 8, wherein the modifying the existing security service function chain is responsive to security analysis of a flow of packets of the existing security service function chain.

10. The method of claim 9, wherein the security analysis is based on real-time monitoring of the flow of packets in the communication network.

11. The method of claim 9, wherein the security analysis is based on reporting from at least one security service function in the communication network.

12. The method of claim 1, wherein at least one of the classification policies comprises two or more of a 5-tuple, a transport port, a set of ports, a part of the packet payload, a user identifier, a service identifier, a service type, a classification type, a service flow path identifier, a sequence of the identified set of security functions, a classification policy generator identifier, a role of the classification policy generator, a next hop locator and one or more actions.

13. The method of claim 1, wherein at least one of the forwarding policies comprises two or more of a 5-tuple, a transport port, a set of ports, a part of the packet payload, a user identifier, a service identifier, a service type, a service flow path identifier, a forwarding policy generator identifier, a role of the forwarding policy generator, a next hop locator and one or more actions.

14. The method of claim 1, further comprising:
determining whether the communication network includes an active instance of each of the identified set of security service functions; and
responsive to determining that the communication network does not include an active instance of at least one of the identified set of security service functions, retrieving an image of the at least one security service function from an image repository and instantiating the at least one security service function in the communication network.

15. The method of claim 1, wherein the creating the first security service function chain comprises matching security criteria to one or more pre-defined security-on-demand templates.

16. The method of claim 1, wherein
the first security service function chain identifies two or more different service function paths, and
at least one of the classification policies specifies one or more rules for assigning packets of the given packet type to the different service function paths.

17. The method of claim 1, wherein the one or more forwarding policies comprise at least one forwarding policy for a legacy security service function not having service function forwarding capabilities, the at least one forwarding policy being provided to a proxy coupled to the legacy security service function in the communication network providing service function forwarding capability for the legacy security service function.

18. The method of claim 1, wherein
the nodes comprise edge nodes in the SDN network architecture, and
the method further comprises providing one or more of the forwarding policies to one or more of the edge nodes in the SDN network architecture.

19. An article of manufacture comprising a processor-readable non-transitory storage medium having embodied therein executable program code that when executed by a processing device causes the processing device to perform:
identify a set of security service functions associated with at least one given packet type from among at least a first set of security service functions and a second set of security service functions,
the first set of security service functions related to a particular service, the first set of security service functions including at least one of Authentication, Authorization, Integrity Validation, and Encryption and Decryption, or any combinations thereof, and
the second set of security service functions not related to any particular service, the second set of security service functions including at least one of Firewall, Anti-Denial of Service (DoS), Intrusion Prevention System, Anti-Malware, Deep Packet Inspection, Intrusion Detection System, or any combinations thereof;
creating a first security service function chain identifying at least a first service function path comprising the identified set of security service functions, at least one of the identified set of security service functions comprising a virtualized network function in a software defined networking (SDN) network architecture;
utilizing the first security service function chain to generate one or more classification policies associating packets of the given packet type with the first security service function chain;
utilizing the first service function path to generate one or more forwarding policies specifying handling of packets of the given packet type by respective ones of the identified set of security service functions;
providing the one or more classification policies to one or more nodes in a communication network comprising the SDN network architecture; and
providing the one or more forwarding policies to one or more of the identified set of security service functions in the communication network.

20. An apparatus comprising:
a memory; and
at least one processor operatively coupled to the memory to form a security-on-demand platform, the security-on-demand platform being configured to:
identify a set of security service functions associated with at least one given packet type from among at least a first set of security service functions and a second set of security service functions,
the first set of security service functions related to a particular service, the first set of security service functions including at least one of Authentication, Authorization, Integrity Validation, and Encryption and Decryption, or any combinations thereof, and
the second set of security service functions not related to any particular service, the second set of security service functions including at least one of Firewall, Anti-Denial of Service (DoS), Intrusion Prevention System, Anti-Malware, Deep Packet Inspection, Intrusion Detection System, or any combinations thereof;

create a first security service function chain identifying at least a first service function path comprising the identified set of security service functions, at least one of the identified set of security service functions comprising a virtualized network function in a software defined networking (SDN) network architecture;

utilize the first security service function chain to generate one or more classification policies associating packets of the given packet type with the first security service function chain;

utilize the first service function path to generate one or more forwarding policies specifying handling of packets of the given packet type by respective ones of the identified set of security service functions;

provide the one or more classification policies to one or more nodes in a communication network comprising the SDN network architecture; and provide the one or more forwarding policies to one or more of the identified set of security service functions in the communication network.

* * * * *

UNITED STATES PATENT AND TRADEMARK OFFICE
CERTIFICATE OF CORRECTION

PATENT NO. : 11,349,881 B2  
APPLICATION NO. : 16/320245  
DATED : May 31, 2022  
INVENTOR(S) : Zhiyuan Hu et al.

Page 1 of 1

It is certified that error appears in the above-identified patent and that said Letters Patent is hereby corrected as shown below:

On the Title Page

Page 2, Column 2, Lines 5-6, under "OTHER PUBLICATIONS," should read:
Office Action issued December 02, 2020 in Chinese Application No. 201680088289.4.

Signed and Sealed this
Eighth Day of November, 2022

Katherine Kelly Vidal
*Director of the United States Patent and Trademark Office*